United States Patent [19]

Carre et al.

[11] Patent Number: 4,629,257
[45] Date of Patent: Dec. 16, 1986

[54] BRAKING CORRECTOR

[75] Inventors: Jean-Jacques Carre, Le Raincy; Jean M. Cheron, Longperrier, both of France

[73] Assignee: Societe Anonyme D.B.A., Paris, France

[21] Appl. No.: 729,845

[22] Filed: May 2, 1985

[30] Foreign Application Priority Data

May 17, 1984 [FR] France ................ 84 07628

[51] Int. Cl.$^4$ ............................. B60T 8/22
[52] U.S. Cl. .................... 303/22 A; 92/64; 251/291; 303/56
[58] Field of Search ............ 91/189 R; 92/64; 251/291; 303/22 A, 22 R, 23 A, 40, 54, 56

[56] References Cited

U.S. PATENT DOCUMENTS

| 3,031,235 | 4/1962 | Schwartz | 303/54 |
| 3,223,458 | 12/1965 | Valentine | 303/56 X |
| 3,399,932 | 9/1968 | Alfieri et al. | 303/56 X |
| 4,353,599 | 10/1982 | Carré et al. | 303/22 R |

FOREIGN PATENT DOCUMENTS

| 0027420 | 4/1981 | European Pat. Off. |
| 1483450 | 4/1967 | France. |
| 1519218 | 2/1968 | France. |
| 1542507 | 3/1979 | United Kingdom. |

Primary Examiner—Duane A. Reger
Attorney, Agent, or Firm—Larry J. Palguta; Ken C. Decker

[57] ABSTRACT

Control device for a braking corrector (10) capable of being imposed between a source of hydraulic pressure and a motor vehicle braking circuit, of the type incorporating a casing (12) provided with at least one bore (14, 14') a plain or differential hydraulic piston (16, 16') sliding in the bore (14, 14') and defining in it a first pressure chamber (18, 18') and a second pressure chamber (22, 22') which are capable of being joined to the source of pressure and to the braking circuit, respectively, the piston (16, 16') controlling the flow of a fluid under pressure between the chambers, the control device incorporating a pilot piston (48) for fluid capable of generating a pilot force (Fp) upon the hydraulic piston (16, 16') so as to push the latter toward the inside of the casing (12) in the direction in which the flow of fluid is established, the fluid under pressure generating a reaction force (Fr) pushing the piston (16, 16') toward the outside of the casing (12) in the direction in which the flow of fluid is interrupted. The control device forms a sub-assembly (34) which is capable of being mounted as a unit on the casing (12) and which is adjustable in position, the sub-assembly (34) incorporating a fixed bulkhead (52) supporting the force of a calibration spring (60) and guiding a rod (66) of the pilot piston (48).

9 Claims, 1 Drawing Figure

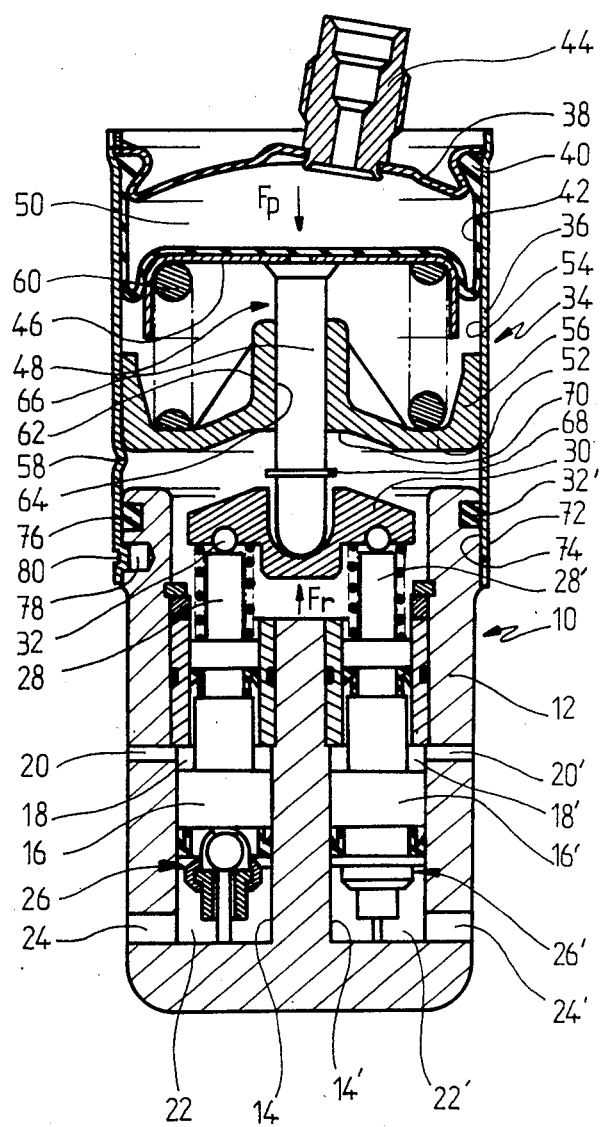

BRAKING CORRECTOR

The subject of the invention is a braking corrector capable of being interposed between a source of hydraulic pressure and a vehicle braking circuit.

The invention relates more specifically to a corrector of the type incorporating a casing provided with at least one bore, a plain or differential hydraulic piston sliding in the bore and defining first and second pressure chambers capable of being joined to the source of pressure and to the braking circuit, respectively, the piston controlling the flow of fluid under pressure between the chambers, and a control device capable of generating a pilot force upon the hydraulic piston so as to push the latter towards the inside of the body in the direction in which the flow of fluid is established, the fluid under pressure generating a reaction force pushing the piston towards the outside of the body in the direction in which the flow of fluid is interrupted.

Such a braking corrector is particularly described, and its function as well as its method of operation are explained, in French Patent Application No. 77-07,361 filed on the 11th of Mar. 1977 in the name of the applicant company. In the document, the pilot force is generated by a control device formed by a lever applying a force upon the hydraulic piston as a function of the load of the vehicle, thus defining a pressure known as the cut-off pressure determined by the characteristics of the corrector when the reaction force exceeds the pilot force, the cut-off pressure for which the flow of fluid between the two chambers is interrupted.

When the control device is of the type with fluid control, and incorporates a cylinder incorporating a calibration spring to define the pilot force upon the hydraulic piston, seizure of the cylinder can occur, for example, as a result of the vehicle being stationary for a long period, and in this case when braking is applied, the reaction force generated upon the hydraulic piston will not be able to push back the cylinder and consequently the flow of fluid cannot be interrupted at the desired moment. Seizure of the cylinder may occur, for example, owing to the presence of a seal made of rubber which would cause "sticking" of components having relative movement, as it well known to a person versed in the art. This problem is further accentuated in the case where the cylinder is subjected to a pressure which varies as a function of the load of the vehicle, in fact, in addition to the problem of "sticking", the variable pressure may be provided by air ensuring the suspension of the vehicle, which air may either be polluted, which would allow the sliding zones to become dirty, or which may carry water, which would allow either corrosion or seizure of the sliding component in the case of freezing.

Such a seizure of the cylinder and the associated incapability of the corrector to interrupt the flow of fluid can cause loss of control of the vehicle through premature locking of the rear wheels, this being likely to occur all the more easily in the case in which the vehicle is lightly loaded.

This type of control also exhibits difficulty with adjustment of the cut-off point, in fact, the calibration spring incorporated in the control device being relatively strong, the variation of the force provided by this calibration spring can cause a large variation of the cut-off points and it is therefore desirable to be able to adjust the force provided by the control device once the latter is installed in position on the corrector so as to achieve the desired accuracy of the cut-off point.

The present invention aims to resolve these problems and proposes for this purpose that, in a braking corrector of the type mentioned above, a control device is provided forming a sub-assembly which is capable of being mounted as a unit on the casing of the corrector and of being adjusted in position, and that the sub-assembly incorporates a fixed bulkhead supporting the force of a calibration spring and guiding a rod of a pilot piston.

In a preferred embodiment of the invention, the pilot piston incorporates a rolling membrane, avoiding any contact of this piston with the body of the control device other than the guidance of its rod in the fixed bulkhead.

According to another characteristic of the invention, the control device is crimped onto the casing of the corrector in such a position as to enable it to be independent of the combined manufacturing tolerances not only of the calibration spring but also of the other components of the control device or of the corrector itself.

A corrector assembly provided with its control device is thus achieved in which there is no risk of seizure of the cylinder, having the desired characteristics of operation and a very simple construction.

The characteristics and advantages of the invention will emerge more clearly from the following description of a preferred embodiment applied to the case of a braking compensator for a dual braking circuit incorporating a control device which is dependent on the load of the vehicle through a pneumatic suspension pressure, given by way of illustration and referring to the accompanying single FIGURE showing such a corrector in section.

The braking corrector, designated as an assembly by the reference 10, incorporates a casing 12 in which are formed two parallel bores 14 and 14'. Each of these two bores 14 and 14' houses a stepped piston 16 and 16', respectively, which is capable of sliding so as to be sealed relative to the casing 12. These pistons 16 and 16' each define in the corresponding bore a first chamber 18 and 18' which is capable of being joined to a source of fluid pressure (not shown) through a supply port 20 and 20', respectively, shown diagrammatically in the FIGURE. Each of the pistons 16 and 16' defines a second chamber 22 and 22', defined between the bottom of the bore and the corresponding piston, and capable of being joined to a braking circuit (not shown), for example the rear wheels of the vehicle, through outlet ports 24 and 24', shown diagrammatically in the FIGURE. In a conventional manner, each piston 16 and 16' incorporates a valve designated as an assembly by the reference 26 and 26', which is capable of putting into communication the chambers 18 and 22, or 18' and 22', according to the position occupied by the pistons 16 and 16' relative to the casing 12. The FIGURE shows each piston 16 and 16' in a position in which the valve is closed. The hydraulic pistons 16 and 16' have ends 28 and 28' which project outside the bores 14 and 14' and upon which a bar 30 comes to bear through components having spherical surfaces 32 and 32'.

In the embodiment shown, the hydraulic pistons 16 and 16' are stepped so that the braking corrector 10 operates as a compensator, that is to say that after closure of the valves any increase in pressure in the first chambers 18 and 18' causes a smaller increase in pressure in the chambers 22 and 22' in a manner which is well known to a person versed in the art.

In accordance with the invention, a control device forming a sub-assembly 34 is mounted as a unit on the corrector 10. This sub-assembly 34 is formed by a tubular body 36 upon which a cover 38 is attached by crimping, sealingly retaining a rim 40 of a rolling membrane 42. The attached cover 38 incorporates an inlet port 44 intended to be joined to a source of pressure (not shown), such as, for example, the suspension pressure of the vehicle. The central portion of the membrane 42 bears upon the crown 46 of a pilot piston 48. A pilot chamber 50 is defined between the membrane 42 and the cover 38. In accordance with the invention, the sub-assembly 34 incorporates a fixed bulkhead 52 positioned centrally on the inner surface 54 of the tubular body 36 by means of a cylindrical portion 56. This cylindrical portion 56 bears axially upon radial projections 58 which are spaced uniformly on a circumference and are obtained by displacing locally the material of the tubular body towards the interior of the latter. A calibration spring 60 is positioned between the fixed bulkhead 52 and the skirt 46 of the piston 48. In accordance with the invention, the bulkhead 52 incorporates a central projection 62 in which an axial bore 64 is formed, in which is slidingly mounted a rod 66 of the piston 48, this rod being firmly fixed to the piston skirt 46. The rod 66 extends beyond the bulkhead 52 in order to cooperate with the bar 30. The rod 66 incorporates an attached abutment 68, formed, for example, by a circlip mounted in a groove, the abutment being capable of bearing axially upon the portion 70 of the bulkhead 52 under the effect of the spring 60 when the pilot chamber 50 is not joined to the source of pressure. It will be noted that the distance between the abutment 68 and the bulkhead 70 is such that the membrane 42 cannot come into contact with the cover 38, thus avoiding damage to the membrane. The tubular body 36 incorporates an extension 72 mounted on a cylindrical portion 74 of the casing 12. A seal 76 mounted in a groove formed in the casing 12 and cooperating with the inside surface 54 of the extension 72 ensures sealing between the casing 12 and the tubular body 36. The casing 12 incorporates holes 78 distributed uniformly on a circumference, into which material of the tubular body 36 is displaced by crimping 80 so as to hold the sub-assembly of the control device in position relative to the corrector 10.

The corrector equipped with its control device which is described above is assembled in the following manner:

In the first stage mounting of the sub-assembly 34 of the control device is carried out. For this operation the bulkhead 52 is first mounted in the tubular body 36, the bulkhead coming to bear upon the abutments 58 previously formed. Taking care to place the calibration spring 60 in position, the piston 48 is mounted and, more particularly, the rod 66 is introduced into the bore 64. By compressing the spring 60, the rod 66 passes through the bulkhead 52 and mounting of the axial abutment 68 is next carried out. The force exerted upon the piston 48 can then be released and the abutment 68 meets the surface 70 of the bulkhead 52, thus holding the spring 60 compressed between the skirt of the piston and the fixed bulkhead. The attached cover 38 is next mounted, equipped with the membrane 42, making sure that the rim 40 remains properly trapped between the cover 38 and the tubular body 36, and then the crimping of the cover 38 onto the body 36 is carried out, the cover 38 having been previously equipped with its inlet port 44.

The corrector 10 having been previously equipped, in a conventional manner, with its pistons 16 and 16' and with the beam 30, assembly of the control device onto the corrector 10 is next carried out. For this operation the extension 72 of the tubular body 36 is engaged on the cylindrical portion 74 of the casing 12, taking care not to damage the seal 76.

While holding the control device 34 relative to the connector 10, the inlet ports 20 and 20' are connected to a source of pressure and the outlet ports 24 and 24' are connected to a test circuit, and in the same way the inlet port 44 is connected to a source of pneumatic pressure. Predetermined pressures are then established at the different inlets, and then by axial displacement of the control device relative to the corrector 10, the position of the tubular body 36 is determined relative to the casing 12 in such a way as to obtain a predetermined cut-off pressure in the corrector relative to the different pressures introduced both in the pilot chamber, and in the inlet and outlet chambers. Crimping 80 of the sub-assembly 34 onto the corrector 10 is then carried out, all the manufacturing tolerances or the variation of the spring force having been incorporated during the definition of the position of the control device relative to the corrector. It is thus unnecessary to carry out any further adjustment.

The operation of the corrector assembly and its control device functions in the following manner:

When the pilot chamber is normally connected to the suspension pressure of the vehicle, or to any other fixed or variable pressure, this pressure existing in the chamber 50 generates a pilot force which compresses the spring 60 and allows a pilot force Fp to be applied to the bar 30 which is directly dependent on the pressure existing in the chamber 50. The calibration spring 60 enables this force Fp to be reduced in proportion. The chambers 18 and 18' being supplied with fluid under pressure, and the pistons 16 and 16' being displaced towards the bottom of their bores 14 and 14' by the pilot piston 48, the flow of fluid is ensured, firstly between the chambers 18 and 22, and secondly between the chambers 18' and 22'. When the pressure in the chambers 22 and 22' increases, these pressures generate reaction forces which push the bar 30 against the force Fp and determine a reaction force Fr upon the latter. When the reaction force Fr is such that it is equal to the pilot force Fp, the three pistons 16, 16' and 48 are displaced upwards, referring to the single FIGURE, thus enabling the flow of fluid, firstly, between the chambers 18 and 22, and secondly, between the chambers 18' and 22', to be interrupted, having reached the desired cut-off pressure for a determined pilot pressure in the pilot chamber 50. Any increase in the pressure of the source of fluid in the chambers 18 and 18' or an increase in the pilot pressure in the chamber 50 causes the valves 26 and 26' to re-open and thus to re-establish the flow of fluid, until such time as the reaction forces and the pilot forces balance once again.

Due to the invention, it is clear that any seizure of the pilot piston 48 owing to corrosion, for example, is impossible given that the sliding of the pilot piston cannot be polluted by the air of the pilot pressure, the membrane ensuring their separation. The sliding of the piston is effected by its rod which is itself in a closed zone which cannot be polluted and is thus sheltered from corrosion. It is also clear that the crimping of the control device onto the corrector 10 enables the assembly to be independent of all tolerances, the crimping being carried out when the cut-off point is obtained for given inlet parameters. Lastly, the control device forming a sub-assembly may be easily manufactured and assembled prior to being mounted on the corrector, which simplifies the final mounting without the risk of damage to the control device owing to the calibration spring 60.

It is obvious that the invention is not limited to the embodiment described, in particular the corrector may be a corrector with a plain hydraulic piston of the pressure-limiting type and clearly it can incorporate a single hydraulic piston only. In the same way, the construction of the control device may be subject to modifications without departing from the framework of the present invention.

We claim:

1. A control device for a braking corrector capable of being interposed between a source of hydraulic pressure and a motor vehicle braking circuit, of the type incorporating a casing provided with at least one bore, a differential hydraulic piston sliding in the bore and defining therein a first pressure chamber and a second pressure chamber capable of being joined to a source of pressure and to the braking circuit, respectively, the hydraulic piston controlling the flow of a fluid under pressure between the chambers, the control device including a pilot piston for fluid capable of generating a pilot force upon the hydraulic piston so as to push the hydraulic piston in a direction in which the flow of fluid is established, the fluid under pressure generating a reaction force pushing the hydraulic piston in a direction in which the flow of fluid is interrupted, characterized in that the control device forms a sub-assembly capable of being mounted as a unit on the casing and which is adjustable in mounted position, and in that the sub-assembly includes a fixed bulkhead supporting the force of a calibration spring and guiding a rod of the pilot piston, the control device including a cover attached to a tubular body, the cover retaining a rolling membrane of the pilot piston to ensure a seal between the body and attached cover and forming a pilot chamber between the membrane and cover.

2. The control device according to claim 1, characterized in that the tubular body is equipped with the bulkhead which is fixed relative to the body and positioned centrally on an inside surface of the tubular body.

3. The control device according to claim 2, characterized in that the bulkhead includes an axial bore formed in a central projection of the bulkhead, the axial bore housing the rod of the pilot piston positioned between the bulkhead and attached cover.

4. The control device according to claim 3, characterized in that the calibration spring is positioned between the bulkhead and pilot piston.

5. The control device according to claim 4, characterized in that the rod includes an axial abutment capable of coming to bear upon the bulkhead under biasing effect of the calibration spring, to prevent the pilot piston from coming into contact with the attached cover.

6. The control device according to claim 1, characterized in that the tubular body extends beyond the bulkhead and is mounted and fixed on a cylindrical portion of the casing.

7. The control device according to claim 6, characterized in that the control device is fixed to the casing by crimping the tubular body in position on the casing.

8. The control device according to claim 7, characterized in that the crimping is carried out when, for a given pressure in the pilot chamber and for a given pressure of the pressure source, the flow of fluid between the first chamber and second chamber is initially interrupted.

9. The control device according to claim 1, characterized in that the pilot piston is capable of being subjected to a pressure which varies with loading of a vehicle.

* * * * *